(12) United States Patent
Kayser et al.

(10) Patent No.: US 7,696,304 B2
(45) Date of Patent: Apr. 13, 2010

(54) THERMALLY STABLE WATER-SOLUBLE POLYMER WHICH IS CROSSLINKABLE AT HIGH TEMPERATURES

(75) Inventors: Christoph Kayser, Mainz (DE); Gernold Botthof, Antrifttal (DE); Karl Heinz Heier, Frankfurt am Main (DE); Aranka Tardi, Neuberg (DE); Matthias Krull, Harxheim (DE); Michael Schaefer, Gruendau (DE)

(73) Assignee: Clariant Produkte (Deutschland) GmbH, Frankfurt (DE)

( * ) Notice: Subject to any disclaimer, the term of this patent is extended or adjusted under 35 U.S.C. 154(b) by 1216 days.

(21) Appl. No.: 11/185,181

(22) Filed: Jul. 20, 2005

(65) Prior Publication Data

US 2006/0019835 A1    Jan. 26, 2006

(30) Foreign Application Priority Data

Jul. 22, 2004    (DE)   ................. 10 2004 035 515

(51) Int. Cl.
     *C08G 73/00*    (2006.01)
(52) U.S. Cl. .................. 528/422; 507/121; 507/259; 523/130; 526/278; 526/287
(58) Field of Classification Search .............. 507/121, 507/259
See application file for complete search history.

(56) References Cited

U.S. PATENT DOCUMENTS

| | | | |
|---|---|---|---|
| 4,095,651 A | 6/1978 | Chauveteau |
| 4,842,071 A | 6/1989 | Zaitoun |
| 5,379,841 A | 1/1995 | Pusch |
| 6,380,137 B1 | 4/2002 | Heier |
| 2003/0109385 A1 | 6/2003 | Gunn |
| 2004/0244975 A1 | 12/2004 | Heier |

FOREIGN PATENT DOCUMENTS

WO    WO 03/033860 A2 * 4/2003

OTHER PUBLICATIONS

European Office Action & Citation, dated Dec. 12, 2005, in corresponding application No. EP05015108.3.

\* cited by examiner

*Primary Examiner*—James Seidleck
*Assistant Examiner*—John J Figueroa
(74) *Attorney, Agent, or Firm*—Tod A. Waldrop

(57) ABSTRACT

The invention relates to a copolymer containing: i) 80-90% by weight of one or more structural units of the formula A, where $R^1$ is hydrogen or methyl, $R^2$ is $C_2$-$C_{10}$-alkylene, and $Me^+$ is an ammonium or an alkali metal ion; ii) from 1 to 10% by weight of one or more structural units of the formula B where $R^3$ and $R^4$ are each independently hydrogen, methyl or ethyl; iii) from 1 to 10% by weight of one or more structural units of the formula C, where n is a number from 1 to 6; iv) from 0.1 to 5% by weight of structural units of the formula D where X is hydrogen, an ammonium ion or an alkali metal ion; and optionally, v) from 0 to 10% by weight of one or more structural units of the formula E, where $R^5$ is hydrogen, methyl and/or ethyl, with the proviso that the content in the copolymers of structural units B) and C) is from 6 to 15% by weight.

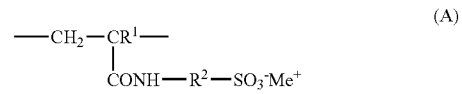

(A)

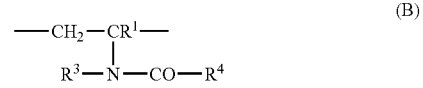

(B)

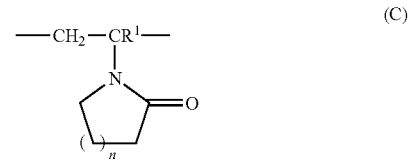

(C)

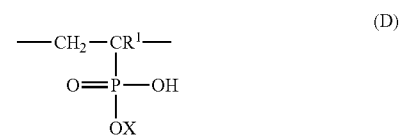

(D)

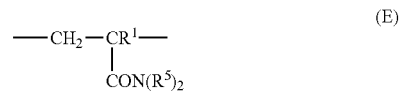

(E)

19 Claims, No Drawings

THERMALLY STABLE WATER-SOLUBLE POLYMER WHICH IS CROSSLINKABLE AT HIGH TEMPERATURES

The present invention relates to a water-soluble, thermally stable polymer which forms gels having prolonged stability with polyvalent metal ions even at temperatures above 200° C. These polymers may be used successfully, for example, to reduce or to completely stop water inflows from an underground formation which comprises hydrocarbons to a production borehole.

In the development and exploitation of mineral oil and natural gas deposits, it is often of crucial importance to selectively modify the permeability of the drilled rock layers, especially for water. For example, it is undesired that large amounts of water flow to a production borehole and, on the other hand, that the drilling fluid is forced into the formation as the borehole is lowered.

Water often exists, usually as a salt solution, in the same formation as oil or gas. The extraction of oil or of hydrocarbon gas, especially in the case of mature sources, is often accompanied by the extraction of water in such an amount that it poses considerable problems; it directly or indirectly causes deposits of salts in the vicinity of the borehole or in the borehole itself, it considerably increases the corrosion of all metal parts underground or overground, it increases, without any benefit, the amounts of the pumped, transferred and stored liquids and it creates emulsions with the oil which are difficult to break overground and which can form blockages in the cavities of the formation underground. Often, the sheer amount of water extracted makes the further production of the hydrocarbon impossible or uneconomic. A large amount of the valuable raw material has to remain unutilized underground.

In the prior art, numerous processes which are intended to reduce the water inflows into the boreholes for the extraction of oil or hydrocarbon gas have been proposed and practiced. They often consist in introducing an impenetrable barrier in the formation between the water and the borehole or between the water and the oil or hydrocarbon gas. The compositions which are usually introduced block almost as much oil or hydrocarbon gas as they do water. The constituents of this barrier may be: cement, resins, suspensions of solid particles, paraffins or water-soluble polymers which can be crosslinked in the deposit by introducing crosslinkers.

At the present time, polymers are used which are introduced into the porous environment in aqueous solution, are adsorbed at the surface of the rock and project into the pore space, so that they are suitable for reducing the water inflows. In the presence of oil or in particular hydrocarbon gas, these gels collapse or contract and then take up a negligible volume at the wall and thus substantially leave the passage free for oil and hydrocarbon gas.

U.S. Pat. No. 4,095,651 discloses the use of hydrolyzed polyacrylamides. However, it has been found that this polymer type is effective mainly toward water having a low salt content and becomes ineffective as a result of the water having a higher salt content. At relatively high temperatures, these hydrolyzed polymers tend, in the presence of polyvalent metal ions, additionally to form precipitates which can block the pores of the rock formations.

U.S. Pat. No. 4,842,071 discloses the use of nonhydrolyzed acrylamide polymers or copolymers which are hydrolyzed by subsequently introducing a basic aqueous solution into the formation which has been treated beforehand. This process requires additional operational complexity by virtue of the sequential introduction of two solutions. It is not always guaranteed that the subsequently supplied basic solution can reach the injected polymer solution and there is an increased corrosion susceptibility of the equipment used. In addition, the polymer solution is only effective on completion of reaction with the basic aqueous solution, and the degree of efficiency is determined by the degree of reaction of both solutions.

EP-B-0 577 931 discloses a process for blocking out water which makes use of polymers composed of 5-90% by weight of AMPA, from 5 to 95% by weight of N-vinylamides and optionally up to 90% by weight of N,N-diallylammonium compounds and optionally up to 90% by weight of a further olefinically unsaturated monomer. These polymers are uncrosslinked. This process is effective only at relatively small permeabilities, for instance in the case of gas probes having permeabilities in the range of a few mD (millidarcy).

EP-A-1 033 378 discloses water-soluble uncrosslinked copolymers composed of acrylamidopropylmethylenesulfonic acid, open-chain N-vinylamides and cyclic N-vinyl-substituted amides and optionally further comonomers. Especially within the temperature range of from 130 to 200° C., these copolymers exhibit improved rheological properties and improved action as a fluid-loss additive.

WO-01/49971 discloses a process for blocking out water using copolymers which bear carboxylate and/or phosphonate groups which are crosslinkable by polyvalent metal ions and/or functional groups which are hydrolyzable to carboxylate groups. In these polymers, the proportion of the crosslinkable phosphonic acid and carboxyl groups has to be between 0.01 and 7.5 mol %.

WO-03/033860 discloses copolymers composed of sulfonic acid-bearing acrylamides, acrylamide, N-vinylamides and vinylphosphonic acid, and a process for reducing or completely stopping water inflows from an underground formation by crosslinking these copolymers with at least one zirconium, chromium, titanium or aluminum compound. At temperatures of 123° C., these polymers effectively reduce the inflow of formation water to production boreholes for mineral oil and natural gas. The process described there provides one means of increasing the relative permeability of a deposit which bears hydrocarbons and water for hydrocarbons. In this context, reference is also made to relative permeability modification, RPM.

In view of the decreasing crude oil and natural gas reserves, deposits are increasingly being developed at greater depths at which temperatures of more than 200° C., for example more than 230° C. and in extreme cases up to above 250° C. are present. Under these conditions, the known crosslinkable polymers are chemically unstable, so that they cannot display their action as fluid-loss additives or to alter the permeability of the formation toward water and oil. In addition, under such extreme conditions, they often precipitate out with alkaline earth metal ions to form insoluble salts. Although the thermal stability of the gel can be increased according to the teaching of WO 03/033860 by increasing the proportion of AMPA, this is at the expense of the crosslinkability and thus of the achievable gel strength and the effectiveness at very high AMPA contents.

It is thus an object of the present invention to provide polymers which are reversibly crosslinkable by polyvalent metal ions and have a low viscosity at room temperature and only form gels with polyvalent metal ions above about 150° C., said gels themselves having prolonged stability even at temperatures above 200° C., for example above 230° C. and in extreme cases above 250° C., without forming precipitates.

It has been found that, surprisingly, polymers having simultaneously distinctly improved thermal stability, improved gel formation properties with polyvalent metal ions and improved stability toward saline waters can be obtained by using polymers which bear phosphonic acid groups and have defined proportions of monomers bearing sulfonic acid groups, open-chain and especially cyclic vinylamides, and also only minor proportions of acrylamide.

The invention thus provides copolymers which are reversibly crosslinkable with polyvalent metal ions at temperatures of above 150° C. and contain i) 80-90% by weight of one or more structural units of the formula A

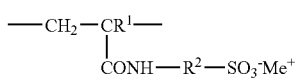

(A)

where $R^1$ is hydrogen or methyl, $R^2$ is $C_2$-$C_{10}$-alkylene, and $Me^+$ is an ammonium or an alkali metal ion, ii) from 1 to 10% by weight of one or more structural units of the formula B

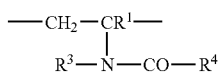

(B)

where $R^3$ and $R^4$ are each independently hydrogen, methyl or ethyl, iii) from 1 to 10% by weight of one or more structural units of the formula C,

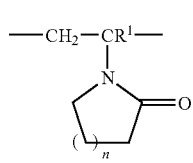

(C)

where n is a number from 1 to 6 iv) from 0.1 to 5% by weight of structural units of the formula D

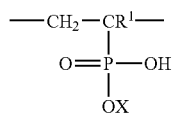

(D)

where X is hydrogen, an ammonium ion or an alkali metal ion, and optionally v) from 0 to 10% by weight of one or more structural units of the formula E

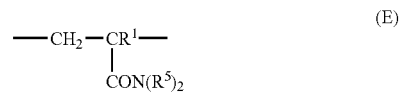

(E)

where $R^5$ is hydrogen, methyl and/or ethyl, with the proviso that the content in the copolymers of structural units B) and C) is from 6 to 15% by weight.

The invention further provides a process for altering the permeability of an underground formation for water or saline water, in which a crosslinker for the copolymer which comprises at least one polyvalent alkaline earth metal and/or transition metal compound is introduced simultaneously with the aqueous solution of the copolymer which contains structural units A), B), C), D) and optionally E) as defined above, or thereafter, into the formation or deposit at temperatures above 200° C., and subsequently taking the borehole for the extraction of mineral oil and/or natural gas into production.

The invention further provides for the use of a copolymer which contains structural units A), B), C), D) and optionally E) as defined above, and a crosslinker for the copolymer, said crosslinker comprising at least one polyvalent alkaline earth metal and/or transition metal compound to alter the permeability of an underground formation for water or saline water at temperatures above 200° C.

The invention further provides a composition which comprises at least one copolymer which contains structural units A), B), C), D) and optionally E) as defined above, and at least one crosslinker which comprises a compound of a polyvalent metal ion.

This composition preferably crosslinks in the oil- and water-bearing formation only after combined or sequential injection of copolymer and crosslinker. Particular preference is given to introducing the crosslinker together with the copolymer into the formation or deposit.

In the structural units A), $R^2$ is preferably a straight-chain or branched, saturated $C_2$-$C_6$-alkylene, more preferably branched, saturated $C_4$-alkylene. $R^1$ is preferably hydrogen. The structural units A) derive preferably from 2-acrylamido-2-methylpropanesulfonic acid (AMPA®). The copolymer preferably contains from 82 to 88% by weight of the structural units of the formula I which are in particular derived from AMPA.

The structural units B) derive from N-vinylformamide, N-vinylacetamide and N-vinyl-N-methylacetamide. In preferred structural units B), $R^1$ is hydrogen, $R^3$ is hydrogen or methyl, and $R^4$ is hydrogen, methyl or ethyl; in particular, $R^3$ and $R^4$ are simultaneously hydrogen. The copolymer preferably contains from 2 to 8% by weight, in particular from 2.5 to 7% by weight, of structural units B).

The structural units C) derive from cyclic amides which bear a vinyl group on the nitrogen atom. Preferred cyclic amides contain a ring having from 5 to 10 atoms of which at least one is a nitrogen atom. Further substituents such as $C_1$-$C_5$-alkyl radicals may be bonded to the ring atoms. Preferably, $R^1$ is hydrogen and n is 1 or 3. Particular preference is given to N-vinylpyrrolidone, N-vinylvalerolactam and N-vinylcaprolactam. The copolymer preferably contains from 2 to 8% by weight, in particular from 2.5 to 7% by weight, of structural units C).

The total content of structural units B) and C) is preferably between 7.5 and 12.5% by weight. The ratio of B) to C) is preferably less than 3:1, for example between 2:1 and 1:20 and more preferably between 1:1 and 1:10.

Structural unit D) derives preferably from vinylphosphonic acid and salts thereof with alkali metal ions, for example sodium and potassium, ammonia, lower alkylamines and/or alkanolamines. Preference is given to vinylphosphonic acid. The structural units E) are present preferably in amounts of from 0.5 to 3% by weight, in particular from 1.0 to 2.5% by weight.

The structural units E) derive from acrylamide, methacrylamide and/or N,N-dimethylacrylamide. Preference is given to acrylamide. The inventive polymers preferably contain from 0.1 to 8% by weight, in particular from 1 to 5% by weight, of the structural units E).

The inventive copolymers may contain minor amounts of, for example, up to 5% by weight, especially from 0.1 to 3% by weight, of further monomers. Preferred further comonomers derive from ethylenically unsaturated compounds which bear a hydrophilic ester, ether, amide, hydroxyl, carboxylic acid and/or sulfonic acid group, or salts thereof. Examples of preferred further monomers are acrylic acid, methacrylic acid, maleic acid, fumaric acid, itaconic acid, hydroxyethyl acrylate, hydroxyethyl methacrylate, hydroxypropyl acrylate, hydroxypropyl methacrylate, vinyl acetate, styrenesulfonic acid and methallylsulfonic acid.

In a particularly preferred embodiment, the proportions of the structural units A), B), C), D) and optionally E) add up to 100% by weight.

The molecular weights of the inventive copolymers are preferably between 50 000 and $2 \cdot 10^7$ g/mol. Particular preference is given to molecular weights of from 100 000 to $10^6$ g/mol, in particular from $5 \cdot 10^5$ to $8 \cdot 10^6$ g/mol. According to Fikentscher, this corresponds, as 0.5% by weight solution in distilled water at 25° C., to certain k values (DIN 53726 and Adolf Echte, Handbuch der Technischen Polymerchemie [Handbook of Industrial Polymer Chemistry], VCH, 1993, p. 264) of from 120 to 350 and preferably of from 150 to 250, or to certain Brookfield viscosities of from 2000 cP to 200 000 cP in distilled water at 25° C. and a polymer concentration of 0.5% by weight.

The inventive copolymers are obtainable by copolymerizing the ethylenically unsaturated compounds from which the structural units of the formulae A, B, C, D and E derive. The copolymers are main chain copolymers and not graft copolymers.

The copolymerization may be carried out by all known polymerization processes. Preference is given to effecting the polymerization in water or in organic solvents which are at least partly miscible or emulsifiable in water, such as lower alcohols having from 1 to 8 carbon atoms, in the range from pH 4 to 12, preferably at pH 5 to 9 and in particular at pH 5.5 to 8. It is preferably carried out as a gel or precipitation polymerization.

To adjust the pH, alkaline salts of alkali metals are appropriately used, for example alkali metal carbonates, alkali metal hydrogencarbonates, alkali metal borates, di- or trialkali metal phosphates, alkali metal hydroxides, ammonia or organic amines of the formula $NR^7R^8R^9$, where $R^7$, $R^8$ and $R^9$ are each independently hydrogen, alkyl having from 1 to 10 carbon atoms, preferably from 1 to 6 carbon atoms, or hydroxyethyl or hydroxypropyl, at least one of the $R^7$, $R^8$ and $R^9$ radicals being different from hydrogen. Preferred bases for adjusting the pH are the abovementioned alkali metal compounds, in particular sodium hydroxide, potassium hydroxide, sodium carbonate, sodium hydrogencarbonate, potassium carbonate and potassium hydrogencarbonate and sodium borates or potassium borates, ammonia, triethylamine, dibutylamine, triethanolamine and n-butyldiethanolamine. Mixtures of different alkali metal salts, ammonia and/or amines are also suitable for adjusting the pH.

The polymerization reaction may be initiated by high-energy electro-magnetic or corpuscular radiation or by substances which form free radicals. Accordingly, suitable polymerization initiators are organic percompounds, for example benzoyl peroxide, alkyl hydroperoxide, for example butyl hydroperoxide, cumene hydroperoxide, p-menthane hydroperoxide, dialkyl peroxides, for example di-tert-butyl peroxide or inorganic per compounds, for example potassium persulfate or ammonium persulfate and hydrogen peroxide, and also azo compounds, for example azobis-isobutyronitrile, dimethyl 2,2'-azobisisobutyrate, 2,2'-azobis(2-amidinopropane) hydrochloride or azobisisobutyramide. It is advantageous to use the organic or inorganic percompounds in combination with reducing substances, for example sodium pyrosulfite, sodium hydrogensulfide, thionyl chloride, ascorbic acid or condensation products of formaldehyde with sulfoxylates. The polymerization can particularly advantageously be performed using Mannich adducts of sulfinic acids, aldehydes and amino compounds, as have been described, for example, in DE-13 01 566.

It is also known to add small amounts of what are known as moderators to the polymerization mixtures, and these moderators influence the course of the reaction by flattening out the reaction rate-time graph. They lead to an improvement in the reproducibility of the reaction and thus enable the preparation of uniform products with extremely small deviations in quality. Examples of suitable moderators of this type are nitrilotrispropionylamide or hydrohalides of monoalkylamines, dialkylamines or trialkylamines, for example dibutylamine hydrochloride. It is also possible to use such moderators advantageously in the preparation of the inventive copolymers.

In addition, it is possible to add what are known as regulators to the polymerization mixtures; these are compounds which influence the molecular weight of the polymers prepared. Suitable known regulators are, for example, alcohols such as methanol, ethanol, propanol, isopropanol, n-butanol, sec-butanol and amyl alcohols, aldehydes, ketones, alkyl mercaptans, for example dodecyl mercaptan and tert-dodecyl mercaptan, thioglycolic acid, isooctyl thioglycolate and some halogen compounds, for example carbon tetrachloride, chloroform and methylene chloride.

Typically, the polymerization is performed in a protective gas atmosphere, preferably under nitrogen.

The reaction is performed preferably in solution, in inverse emulsion, in suspension, as a gel polymerization or under the conditions of the precipitation polymerization, at temperatures of from −5 to 120° C., preferably from 5 to 100° C.

When water is used as a solvent for the polymerization reaction, it proceeds at low monomer concentrations in solution, and an aqueous viscous solution of the copolymer is obtained.

The reaction product of the copolymerization may be isolated either by distilling the water out of the solution, or by mixing the aqueous solution with organic solvents which are fully miscible with water, but in which the copolymer is insoluble. When such organic solvents are added to the aqueous polymer solution, the resulting copolymer precipitates out and can be removed from the liquid phase, for example by filtration. However, preference is given to using the resulting aqueous solution of the polymer or copolymer directly for further use, optionally after adjusting to a certain desired concentration.

At relatively high monomer concentrations of from 20 to 70% by weight in aqueous solutions, the polymerization proceeds preferentially as a gel polymerization. Particular preference is given in this context to concentrations of from 20 to 55% by weight, in particular of from 25 to 40% by weight. To this end, the pH of the monomer solution is adjusted as described above, the solution is inertized with protective gas, adjusted to the desired temperature and polymerized with a suitable initiator system, in such a way that a cut-resistant gel is formed. The polymer may be isolated from the gel by mechanically comminuting and drying it. The dried polymer is ground to the desired particle size with a suitable mill. The gel polymerization is a process for preferentially preparing polymers having high or extremely high molecular weights. It is possible using gel polymerization to preferentially prepare polymers having molecular weights which correspond to K values of >200, preferably of from 250 to 350.

A further preferred polymerization process is inverse emulsion polymerization. In this process, a monomer solution is emulsified as described above as an inverse emulsion in a suitable carrier liquid. Preference is given to generating a water-in-oil emulsion in organic solvents or oils. In this case, the continuous phase is the oil phase, the discontinuous phase the aqueous monomer phase. The latter is preferably stabilized with the aid of suitable emulsifiers. The size of the emulsified particles is determined by the type and intensity of the energy which is introduced to bring about the comminution of the aqueous monomer solution into small or microscopic droplets. This comminution energy is preferably introduced by the shear energy of a suitable stirrer or homogenization tool, or else by the use of ultrasound sources. The size and stability of the emulsion particles is equally determined by the type and concentration of the emulsifier system. With the aid of inverse emulsion polymerization, polymers having high or extremely high molecular weight are prepared preferentially, preferably in a range of from $5 \cdot 10^5$ to $10^7$ daltons. Preference is given to obtaining polymers whose inverted emulsions having a polymer concentration of 0.5% by weight in distilled water have a Brookfield viscosity at 50 revolutions per minute of from 1000 to 20 000 cP.

Owing to their content of inverting agent and the high molecular weight, the molecular weight of inverse emulsion polymers is characterized by determining solution viscosities according to Brookfield. For this purpose, the inverse polymer emulsion is inverted by known methods. The viscosity is measured with a digital Brookfield viscometer with a suitable spindle at 50 rpm.

The polymer is preferably not isolated from the emulsion. Instead, the emulsion serves to provide a high molecular weight polymer in free-flowing form. The concentration of the polymer in the emulsion is preferably from 20 to 50% by weight. It is equally possible to convert the emulsion to a suspension by distilling the water out of the emulsion. Thus, polymer contents in a free-flowing suspension of over 50% by weight, preferably between 50 and 70% by weight, have to be attained.

When the copolymerization is carried out in an organic solvent, for example in a lower alcohol, e.g. in tert-butanol, it proceeds under the conditions of precipitation polymerization. In this case, the resulting polymer or copolymer precipitates out in solid form in the course of the reaction and can readily be isolated in a customary manner, for example by suction and subsequent drying. It will be appreciated that it is also possible and preferred in many cases to distill the solvent out of the reaction mixture.

The crosslinkers used for the inventive polymer are in particular polyvalent metal ions, for example of elements of main groups II and III and of transition groups III-VI of the Periodic Table. Preference is given to using salts and complexes of zirconium, chromium, titanium and/or aluminum. Preference is given to di-, tri- and tetravalent ions of these metals. Suitable anions are mono- to trivalent organic anions, for example carbonate, acetate, propionate, 2-ethylhexanoate, neononanoate, neodecanoate, lactate, gluconate, citrate, maleate, glycinate, tartrate, ethylacetoacetate, and combinations thereof. Particularly preferred crosslinkers are compounds of chromium, of zirconium and/or of titanium. Especially preferred are chromium salts, in particular chromium acetate, lactate and citrate, and salts or complexes of zirconium(IV), in particular zirconium acetate, lactate, citrate and zirconium gluconate.

The inventive copolymers are generally introduced in aqueous solution into the formation or deposit. The concentration of the aqueous polymer solution may be selected within wide ranges and is preferably between 50 ppm and 10%, in particular from 0.05% to 5% in parts by weight. The selected concentration decides the firmness of the resulting polymer gel and is determined by the desired use.

The aqueous polymer solution may comprise one or more salts of alkali metals or alkaline earth metals, in particular NaCl, KCl, $MgCl_2$, $MgSO_4$, $CaCl_2$, $Na_2SO_4$, $K_2SO_4$ and/or $NaNO_3$, and generally of chlorides, sulfates or nitrates of metals, for example sodium, potassium, calcium or magnesium. Preference is given to solutions which comprise sodium chloride or potassium chloride. Particular preference is given to seawater, formation water or else process water. The concentration of salts of the salt-containing polymer solution may be selected within wide ranges and range up to the saturation limit of the salts. In a preferred embodiment, potassium chloride is used, which prevents the swelling of clay in the formations. Swelling of the clay could lead to irreversible formation damage.

Generally, for a given salt, the viscosity of the polymer solution decreases when the concentration of this salt grows. It is thus advantageously possible in the present process to use a polymer solution whose salt content of sodium chloride is higher than the salt content of the water of the deposit.

The crosslinker may be used directly as a solid, but is preferably used in the form of aqueous solutions. The concentration of the crosslinker solution may vary over a wide range. The concentration of the crosslinker in the crosslinker solution may vary from about 0.001% by weight up to saturation. It is preferably in the range of from 1% by weight to 25% by weight.

For sequential use, for example in the case of relative permeability control of hydrocarbon deposits, particularly useful solutions have been found to be those having a concentration of from 0.001 to 2% by weight based on the metal ions. The concentration of the crosslinker is preferably in the range of from 0.01 to 1% by weight, in particular in the range of from 0.025 to 0.5% by weight, based on the metal ions used. The solvents used for the crosslinker solution are preferably the same media as for the polymer solution.

In the case of applications such as blocking pills against flushing losses, for example, preference is given to using more highly concentrated solutions having concentrations of 1% by weight up to saturation, preferably from 5 to 15% by weight. Alternatively, the solvent-free substances may also be used.

In the case of combined application of polymer and crosslinker, the components are preferably used in the above-mentioned concentrations.

The polymer and/or crosslinker solutions may also contain up to 20% by volume of one or more further solvents, in order, for example, to remove hydrocarbon residues from the surface of the water-bearing formation and to ease attachment of the water-soluble polymer to the rock surface. Suitable solvents therefor are lower alcohols, (alkyl)glycols and (alkyl)polyglycols. However, it has to be ensured that the polymer remains in solution and does not precipitate out.

The copolymer and the crosslinker solution or, in the case of combined application, the solution of both constituents is preferably adjusted to a pH which does not induce any acid/base reaction in the formation to be treated. Preference is given to buffering these solutions in the range from pH 4 to 9. For example, it has been found to be useful to work with an acetate buffer in the pH range of from pH 5 to 8 and especially from pH 4.5 to 5.5.

Appropriate selection of the contents of the structural units of the formulae A, B, C, D and optionally E, and of the type and concentration of the crosslinker used, allows the lower limiting temperature of gel formation, the gel strength and the lifetime of the gel under the given conditions underground to be adjusted precisely. For example, the permeability of deposits having temperatures of above 200° C., in particular of above 230° C., for water and hydrocarbon can be influenced selectively with the inventive copolymers.

The way in which the polymer solution is introduced is not new per se. Reference can be made, for example, to the remarks in U.S. Pat. No. 3,308,885. Generally speaking, a pressure is exerted on the polymer solution which is greater than the pressure which is exerted by the fluids such as deposit water, oil and hydrocarbon gas in the deposit which is selected for the treatment (deposit pressure).

In a further preferred embodiment of the process, water or a thickened aqueous polymer solution is introduced into the borehole as a spacer between the introduction of the copolymer and the introduction of the crosslinker.

In a further preferred embodiment, the above-described introduction of a spacer may instead or additionally be effected after the introduction of the crosslinker.

In a further preferred embodiment, there may be a shut-in phase of greater or lesser duration after the solutions of the copolymer and of the crosslinker have been introduced, before the probe is switched back to production.

The introduction of copolymer solution and crosslinker in any ratios may equally be repeated before or after the probe has been switched back to production. This allows different zones to be treated selectively.

In a further preferred embodiment, portions or else the entire polymer-water mixture may be injected pretreated with crosslinker.

When required, the crosslinking of the polymer can be eliminated by the action of certain substances on the gel barrier. Suitable in principle are substances which are stronger complexing ligands for the metal ion than the phosphonic acid or amine or amide groups of the polymer, and also oxidizing agents. Useful substances in this context have been found to be hydrofluoric acid or precursors thereof and strong chelating agents, for example EDTA. Among the oxidizing agents, persulfates, perborates and hydrogen peroxide have been found to be useful.

The inventive polymer systems are suitable for various possible uses in the field of exploration, completion and extraction of mineral oil and natural gas deposits. They are particularly advantageous when used for the development and extraction of mineral oil and natural gas deposits which lie under extremely high temperatures of above 200° C., for example above 230° C., as frequently occur at high depths. In particular, they are suitable for reducing or for preventing water inflow from an underground formation which comprises hydrocarbons to a production borehole. Equally, they may be used successfully to block underground formations against outflow of drilling fluids from the borehole. Typically, they are used for this purpose in combination with further assistants. While conventional polymers had to be brought to gelation by subsequently separately injecting the crosslinker into the formation, the inventive polymers, owing to their lack of tendency to form gel, can be pumped into the formation together with the crosslinker at low temperatures without gelling prematurely. In addition to simplified handling, this leads to better and more homogeneous penetration of the formation with the gel.

The inventive polymers of relatively high molecular weight in a concentration of 5% by weight give rise to a polymer solution of low stirrability. Therefore, the high molecular weight polymers are of interest for applications in which very low polymer concentrations are intended to bring about very elastic gels, deformable gels of type E to F (cf. table). These polymers are prepared preferably by means of the inverse emulsion and gel polymerization process. Conceivable applications which would fit this profile would, for example, be polymer floodings of formations to control the relative permeability of the deposit with respect to hydrocarbons and water.

The polymer solutions having low viscosity are still readily stirrable and pumpable even in a 5% by weight solution. They are prepared preferably in the form of the solution and precipitation polymerization process. These polymers are suitable particularly for highly concentrated, firm, elastic polymer gels, as appear to be suitable, for example, for applications as blocking pills and the like.

EXAMPLES

The examples listed below for the synthesis of suitable polymers illustrate the invention. The abbreviations used in the working and table examples are defined as follows:

TABLE 1

| Abbreviations used | |
|---|---|
| AM | acrylamide |
| AMPA ® | 2-acrylamido-2-methylpropanesulfonic acid |
| NVC | N-vinylcaprolactam |
| NVF | N-vinylformamide |
| NVP | N-vinylpyrrolidone |
| VIMA | N-vinyl-N-methylacetamide |
| VPA | vinylphosphonic acid |

Example 1

Inverse Emulsion Polymerization 7.5 g of Genapol® UD 050 (nonionic emulsifier based on an oxyethylated undecyl alcohol) and 20.5 g of Span® 80 (nonionic emulsifier based on a sugar alcohol stearate) are dissolved in 350 ml of Isopar® M (technical-grade mixture of isoparaffins having a boiling point of approx. 200-240° C.) and the resulting solution is introduced into a 1 l reaction vessel which is equipped with a stirrer, thermometer and gas inlet tube.

An aqueous monomer solution is then prepared by dissolving
85 g of AMPA,
5 g of AM and
1.7 g of vinylphosphonic acid (VPA) in
120 ml of water.

The pH of the aqueous monomer solution is adjusted to 8.5 using ammonia (25%), before 5 g of NVF and 3.3 g of NVP are added. With rapid stirring, the aqueous monomer solution is added to the organic phase. The reaction vessel is inertized with nitrogen by evacuation and subsequent filling. Afterward, a solution of 0.02 g of t-butyl hydroperoxide in 3 ml of water is added to the mixture. After stirring for a further 5 min, the polymerization is initiated by adding 0.01 g of ascorbic acid. The reaction lasts about 1½ hours, in the course of which the reaction temperature is kept between 30° C. and 40° C. by water cooling. After the evolution of heat has abated, the reaction mixture is stirred at 60° C. for another 2 h. A stable emulsion results. The inverse polymer emulsion is inverted with 5 g of Genapol UD 050 in a beaker containing 500 ml of distilled water, the amount of inverse emulsion equivalent to 0.5% by weight of polymer, and stirred with the blade stirrer for 2 h. The temperature of the solution is controlled at 25° C. for 2 hours, in the course of which incorporated air bubbles escape. The viscosity is measured with a digital Brookfield viscometer. The resulting, clear 0.5% by weight polymer solution has a Brookfield viscosity of approx. 1400 cP (at 25° C. and 50 rpm, spindle 2).

Example 2

Solution Polymerization

In a polymerization reactor of capacity 1 liter, equipped with flange lid, stirrer, thermometer and gas inlet tube,
80 g of AMPA are dissolved in
400 g of water,
3 g of VPA are added
and neutralization is effected with ammonia (25%). Then, 2 g of acryl-amide, 7.5 g of NVF and 7.5 g of NVP are added. The pH is adjusted to 8.5 with ammonia and the reaction mixture is heated to 70° C. while stirring and passing nitrogen through. 1 g of an aqueous 10% dibutylamine-HCl solution and 0.1 g of ammonium persulfate are added. The reaction takes about 30 minutes, in the course of which the temperature rises to 70° C. The reaction mixture becomes viscous. The mixture is heated at 80° C. with stirring for another 2 h. A clear, highly viscous solution is obtained. The k value, determined in distilled water at 25° C., is 205.

Example 3

Gel Polymerization

In a polymerization flask of capacity 1 l, equipped with flange lid, stirrer, thermometer and gas inlet tube, a monomer solution is prepared by dissolving
83.5 g of AMPA and
1.5 g of VPA in
250 g of water. The pH is adjusted to 8.5 with ammonia (25%). In each case 5 g of NVF, NVP and AM are added to the solution. With stirring and while passing nitrogen through, 1 g of an aqueous 10% dibutylamine-HCl solution and 0.1 g of ammonium persulfate are finally added. While passing nitrogen through, the mixture is stirred at increased stirring rate for another 3 min. The nitrogen introduction is ended and gas inlet tube and stirrer are pulled up. After an induction time of approx. 30 min, the polymerization sets in, in the course of which the temperature rises from 20° C. to 78° C. and the solution becomes a dimensionally stable gel. After a continued heating time of 8 h at 60° C., the gel is cooled to room temperature, comminuted, dried and ground. The k value, measured in distilled water at 25° C., is approx. 250.

Example 4

Precipitation Polymerization

In a polymerization flask of capacity 1 liter, equipped with stirrer, reflux condenser, thermometer, dropping funnel and gas inlet tube,
83.3 g of AMPA and
1.7 g of VPA are dissolved in
400 ml of tert-butanol and adjusted to pH 7.5 with ammonia. In each case 5 g of NVF, NVP and AM are added to this solution. With stirring and while introducing nitrogen, the monomer solution is heated to 60° C. and 1 g of azoisobutyronitrile is added. After an induction time of approx. 3 min, the polymerization sets in, the reaction temperature rises to 80° C. and the polymer precipitates out. The mixture is heated at 80° C. for another 2 h. The copolymer is isolated by drying. The polymer is obtained in the form of a white, lightweight powder which dissolves readily in water and has a k value, measured in distilled water at 25° C., of 208.

According to these four procedures, the copolymers of the table 2 which follows were also prepared. The underlying polymerization processes can be found in the "method" column. In this column, "IE" means the method of inverse emulsion polymerization.

TABLE 2

Characterization of the copolymers used

| Example | AMPA [% by wt.] | AM [% by wt.] | NVF [% by wt.] | NVP [% by wt.] | VPA [% by wt.] | Additive [% by wt.] | Method | Polymer | k value or viscosity [cP]* |
|---|---|---|---|---|---|---|---|---|---|
| 1 | 85 | 5 | 5 | 3.3 | 1.7 | — | IE | A | 1430 cP |
| 2 | 80 | 2 | 7.5 | 7.5 | 3 | — | solution | B | 205 |
| 3 | 83.5 | 5 | 5 | 5 | 1.5 | — | gel | C | 251 |
| 4 | 82 | 5 | 5 | 5 | 3 | — | IE | D | 1350 cP |
| 5 | 82 | 5 | 5 | 5 | 3 | — | precipitation | E | 212 |
| 6 | 83.3 | 5 | 5 | 5 | 1.7 | — | precipitation | F | 210 |
| 7 | 84 | 5 | 5 | 5 | 1 | — | precipitation | G | 211 |

TABLE 2-continued

Characterization of the copolymers used

| Example | AMPA [% by wt.] | AM [% by wt.] | NVF [% by wt.] | NVP [% by wt.] | VPA [% by wt.] | Additive [% by wt.] | Method | Polymer | k value or viscosity [cP]* |
|---|---|---|---|---|---|---|---|---|---|
| 8 | 84.5 | 5 | 5 | 5 | 0.5 | — | precipitation | H | 208 |
| 9 | 88 | 3.5 | 3 | 4 | 1.5 | — | precipitation | I | 207 |
| 10 | 83.3 | 5 | 5 | 5 | 1.7 | — | solution | J | 198 |
| 11 | 83.3 | 5 | 5 | 5 | 1.7 | — | gel | K | 247 |
| 12 | 83.3 | 5 | 5 | 5 | 1.7 | — | IE | L | 1620 cP |
| 13(C) | 79 | 5 | 5 | 5 | 6 | — | precipitation | M | 210 |
| 14(C) | 85 | 10 | 1.7 | 2 | 1.3 | — | precipitation | N | 204 |
| 15(C) | 83 | 13 | 2.7 | 0 | 1.3 | — | precipitation | O | 205 |
| 16(C) | 83 | 13 | 0 | 2.7 | 1.3 | — | precipitation | P | 209 |
| 17(C) | 95 | 0.7 | 0 | 0 | 1.3 | 3.0% NVC | precipitation | Q | 208 |
| 18(C) | 94.5 | 0.5 | 2.5 | 0 | 2.5 | — | precipitation | R | 204 |

*Alternative specification. The k value is dimensionless; the viscosity is reported as the Brookfield viscosity in cP with 0.5% by weight of inverted polymer in solution, 50 rpm, spindle 2

Examples 1 to 12 are inventive examples which illustrate the invention. In contrast, examples 13 to 18 are comparative examples. The performance properties of the resulting polymers M to R exhibit distinct disadvantages compared to the inventive polymers A to L.

The molecular weights of the polymers are characterized by the k value according to Fikentscher (analogously to DIN 53726 in distilled water). The k value is a concentration-independent, dimensionless characteristic value. It rises with rising molecular weight. Polymers of the same composition are directly comparable. However, even in the case of relatively similar composition, polymers of the same molecular weight have comparable k values.

Owing to their content of inverting agent and the high molecular weight, solution viscosities according to Brookfield are determined to characterize the molecular weight of inverse emulsion polymers. For this purpose, the inverse polymer emulsion is inverted according to example 1. The viscosity is measured with a digital Brookfield viscometer with a suitable spindle at 50 rpm.

Examples 19 to 36 in table 3 show results of crosslinking experiments at 200° C. In these experiments, the polymers were in each case dissolved in water while stirring with a basket stirrer for 2 hours. Subsequently, the crosslinker was added to the polymer solution and the mixture was stirred for 30 min. The homogeneous solution was placed in FANN HTHP aging cells in beakers. The aging cells were charged with from 1700 to 2100 kPa of nitrogen. The aging cells filled in this way are heat-treated standing in an oven for 16 h. After cooling, the cell is decompressed and the beaker containing the polymer gel removed and evaluated. The gel is classified by visual appearance into the gel classes familiar in industry (table 3), and the measure of syneresis (shrinkage induced by the thermal crosslinking of the polymer) is specified as the percentage of syneresis water which leaves the polymer gel during the crosslinking in the total amount of polymer gel. Low syneresis is to be regarded as advantageous.

Examples 19 to 30 illustrate the performance of polymers A to L at 5% by weight active polymer content and one percent of chromium(III) acetate as the crosslinker. Examples 31 to 36 are comparative examples which show the performance of polymers M to R, which are not inventive.

TABLE 3

Crosslinking of the example polymers at 200° C.

| | | | | | Amount of | 200° C. | |
|---|---|---|---|---|---|---|---|
| Example | Polymer | Amount tq [g] | Water [g] | Crosslinker | crosslinker [g] | Gel quality A to H* | Syneresis [%] |
| 19 | A | 5 | 94 | chromium(III) acetate | 1 | H | 6 |
| 20 | B | 25 | 74 | chromium(III) acetate | 1 | H | 13 |
| 21 | C | 5 | 94 | chromium(III) acetate | 1 | H | 13 |
| 22 | D | 16 | 83 | chromium(III) acetate | 1 | H | 0 |
| 23 | E | 5 | 94 | chromium(III) acetate | 1 | H | 21 |
| 24 | F | 5 | 94 | chromium(III) acetate | 1 | H | 11 |
| 25 | G | 5 | 94 | chromium(III) acetate | 1 | G | 0 |
| 26 | H | 5 | 94 | chromium(III) acetate | 1 | G | 0 |
| 27 | I | 5 | 94 | chromium(III) acetate | 1 | H | 0 |
| 28 | J | 5 | 94 | chromium(III) acetate | 1 | G | 0 |
| 29 | K | 5 | 94 | chromium(III) acetate | 1 | H | 3 |
| 30 | L | 5 | 94 | chromium(III) acetate | 1 | H | 2 |
| 31 | M | 5 | 94 | chromium(III) acetate | 1 | H | 43 |
| 32 | N | 5 | 94 | chromium(III) acetate | 1 | F | n.e.** |
| 33 | O | 5 | 94 | chromium(III) acetate | 1 | F | n.e.** |

TABLE 3-continued

Crosslinking of the example polymers at 200° C.

|         |         |                |              |                  | 200° C.           |                              |                  |
|---------|---------|----------------|--------------|------------------|-------------------|------------------------------|------------------|
| Example | Polymer | Amount tq [g]  | Water [g]    | Crosslinker      | Amount of crosslinker [g] | Gel quality A to H* | Syneresis [%]  |
| 34      | P       | 5              | 94           | chromium(III) acetate | 1            | F                            | n.e.**           |
| 35      | Q       | 5              | 94           | chromium(III) acetate | 1            | D                            | n.e.**           |
| 36      | R       | 5              | 94           | chromium(III) acetate | 1            | D                            | n.e.**           |

*see table 4, gel types
**not evaluable, since a nonuniform product was present whose liquid and gel portions could not be separated Table 4 shows the classification, familiar in industry, of the gel type which was used to evaluate the polymer gels.

TABLE 4

Gel type classification

| Gel type | Meaning |
|----------|---------|
| A | low-viscosity liquid |
| B | increased viscosity |
| C | viscoelastic liquid (bubbles escape only slowly, vibration slightly elastic) |
| D | soft free-flowing gel |
| E | soft "curtains" |
| F | elastic tongues of gel |
| G | deformable gels |
| H | solid resonant gel |

In examples 19 to 30, the inventive polymers A to L afford solid gels of the G and H type. Surprisingly, polymers having a total content of from 6 to 15% by weight of structural units B and C exhibit good crosslinkability, they give rise to gels of the G and H type and exhibit little syneresis. Examples 19 to 22 and 28 to 30 make clear that in principle all polymerization methods used give rise to firm gels. For better comparability, all polymers were analyzed at the same concentration of 5% by weight in table 3 and table 5.

Examples 23 to 27 illustrate the influence of the chemical composition on the crosslinking properties of the polymers. Examples 23 to 26 show the influence of the amount of vinylphosphonic acid added on the polymer gels formed under otherwise identical conditions. A rising concentration of vinylphosphonic acid leads to rising stiffness of the polymer gel. On the other hand, syneresis also occurs to a low percentage extent at high VPA concentrations. In example 27, the AMPA-rich polymer I forms a somewhat softer syneresis-free gel of the H type in comparison to example 24.

Comparative examples 31 to 36 already exhibit distinct weaknesses in firmness or syneresis at a crosslinking and aging temperature of 200° C. Polymers having a high AMPA content barely exhibit any gel formation at 200° C. A VPA content increased above 5% by weight or an acrylamide content increased above 10% by weight led to higher syneresis. When the sum of component B and C is less than 6 to 15% by weight, the crosslinkability of the polymer becomes poorer.

TABLE 5

Crosslinking of the example polymers at 232° C. (450° F.)

|         |         |               |           |                       |        | 232° C.             |               |
|---------|---------|---------------|-----------|-----------------------|--------|---------------------|---------------|
| Example | Polymer | Amount tq [g] | Water [g] | Crosslinker           | Amount [g] | Gel quality A to H* | Syneresis [%] |
| 37 | A | 5  | 94 | chromium(III) acetate | 1 | H***      | 10     |
| 38 | B | 25 | 74 | chromium(III) acetate | 1 | H         | 25     |
| 39 | C | 5  | 94 | chromium(III) acetate | 1 | H         | 2      |
| 40 | D | 16 | 83 | chromium(III) acetate | 1 | G***      | 37     |
| 41 | E | 5  | 94 | chromium(III) acetate | 1 | G         | 23     |
| 42 | F | 5  | 94 | chromium(III) acetate | 1 | H         | 1      |
| 43 | G | 5  | 94 | chromium(III) acetate | 1 | G         | 0      |
| 44 | H | 5  | 94 | chromium(III) acetate | 1 | G         | 0      |
| 45 | I | 5  | 94 | chromium(III) acetate | 1 | H         | 0      |
| 46 | J | 5  | 94 | chromium(III) acetate | 1 | G         | 0      |
| 47 | K | 5  | 94 | chromium(III) acetate | 1 | G         | 3      |
| 48 | L | 5  | 94 | chromium(III) acetate | 1 | G***      | 5      |
| 49 | M | 5  | 94 | chromium(III) acetate | 1 | shrunk    | 61     |
| 50 | N | 5  | 94 | chromium(III) acetate | 1 | collapsed | 67     |
| 51 | O | 5  | 94 | chromium(III) acetate | 1 | collapsed | 65     |
| 52 | P | 5  | 94 | chromium(III) acetate | 1 | collapsed | 65     |
| 53 | Q | 5  | 94 | chromium(III) acetate | 1 | gel lumps | n.e.** |
| 54 | R | 5  | 94 | chromium(III) acetate | 1 | gel lumps | n.e.** |

*see table of the gel types
**not evaluable, since a nonuniform product was present whose liquid and gel portions could not be separated
***discolored Even at 450° F. or 232° C., examples 37 to 48 exhibit firm gels and low syneresis. In some variants with increased VPA content, syneresis is observed at high polymer concentrations. However, type G and H gels are obtained throughout.

Comparative examples 49 to 54 do not form any gels at 232° C. An acrylamide content rising above 10% by weight leads to increasing syneresis of the polymer at elevated temperatures.

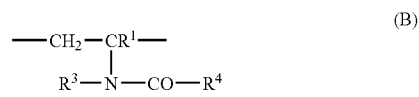

TABLE 6

Gel type as a function of the concentration of the polymer

|  |  |  |  |  |  | 200° C. | |
| --- | --- | --- | --- | --- | --- | --- | --- |
| Example | Polymer | Amount tq [g] | Water [g] | Crosslinker | Amount [g] | Gel quality A to H* | Syneresis [%] |
| 74 | F | 4 | 95 | chromium(III) acetate | 1 | H | 0 |
| 75 | F | 2 | 97 | chromium(III) acetate | 1 | F | 0 |
| 76 | F | 1 | 98 | chromium(III) acetate | 1 | C | 0 |
| 77 | F | 0.5 | 98.5 | chromium(III) acetate | 1 | A | 0 |
| 78 | K | 2.5 | 96.5 | chromium(III) acetate | 1 | G | 0 |
| 79 | K | 1 | 98 | chromium(III) acetate | 1 | G | 0 |
| 80 | K | 0.5 | 98.5 | chromium(III) acetate | 1 | F | 0 |
| 81 | K | 0.25 | 98.75 | chromium(III) acetate | 1 | F | 0 |
| 82 | L | 8 | 91 | chromium(III) acetate | 1 | G | 0 |
| 83 | L | 4 | 95 | chromium(III) acetate | 1 | G | 0 |
| 84 | L | 2 | 97 | chromium(III) acetate | 1 | F | 0 |
| 85 | L | 1 | 98 | chromium(III) acetate | 1 | F | 0 |

*see table of the gel types
** not evaluable, since a nonuniform product was present whose liquid and gel portions could not be separated
*** discolored It can be seen from the results in table 6 that polymers having different molecular weights are suitable for different applications depending on the use concentration. In a polymer concentration of 4% by weight, the polymer F gives rise to a stirrable and pumpable solution. After crosslinking, this leads to a firm polymer gel of the H type. In lower concentrations, of 0.5 and 1% by weight for example, lower viscosification or no gel formation was observed. At use concentrations of approx. 5% by weight based on the active polymer, polymers K and L exhibit high-viscosity solutions and likewise form firm gels of the H type. However, owing to the high molecular weight, they are also capable at lower use concentrations, for example from 0.25 to 0.5% by weight, of forming soft, highly elastic gels.

What is claimed is:

1. A copolymer which is reversibly crosslinkable with polyvalent metal ions at temperatures of above 150° C. and comprises:

i) 80-90% by weight of one or more structural units of the formula A

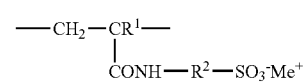

where $R^1$ is hydrogen or methyl,
$R^2$ is $C_2$-$C_{10}$-alkylene, and
$Me^+$ is an ammonium or an alkali metal ion, ii) from 1 to 10% by weight of one or more structural units of the formula B where $R^3$ and $R^4$ are each independently hydrogen, methyl or ethyl, iii) from 1 to 10% by weight of one or more structural units of the formula C,

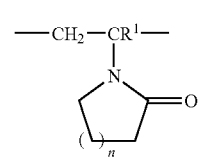

where n is a number from 1 to 6, iv) from 0.1 to 5% by weight of structural units of the formula D

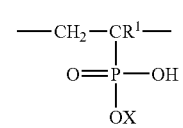

where X is hydrogen, an ammonium ion or an alkali metal ion, and optionally, v) from 0 to 10% by weight of one or more structural units of the formula E

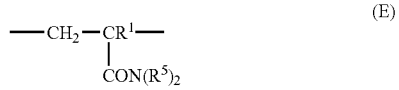

where $R^5$ is hydrogen, methyl and/or ethyl, with the proviso that the content in the copolymers of structural units B) and C) is from 6 to 15% by weight.

2. The copolymer as claimed in claim 1, comprising from 82 to 88% by weight of the structural units of the formula (A).

3. The copolymer as claimed in claim 1, comprising from 2 to 8% by weight of the structural units of the formula (B).

4. The copolymer of claim 1, comprising from 2 to 8% by weight of the structural units of the formula (C).

5. The copolymer of claim 1, containing from 0.5 to 3% by weight of the structural units of the formula (D).

6. The copolymer of claim 1, containing from 0.1 to 8% by weight of the structural units of the formula (E).

7. The copolymer of claim 1, in which $R^2$ is a $C_4$-alkylene group.

8. The copolymer of claim 1, in which $R^3$ and $R^4$ are simultaneously hydrogen.

9. The copolymer of claim 1, in which the total content of structural units of the formula (B) and (C) is from 7.5 to 12.5% by weight.

10. The copolymer of claim 1, in which the weight ratio of the structural units of the formula (B) to (C) is less than 3:1.

11. The copolymer of claim 1, in which X is hydrogen.

12. The copolymer of claim 1, in which $R^5$ is hydrogen.

13. The copolymer of claim 1, in which the proportions of the structural units (A), (B), (C) and (D) add up to 100% by weight.

14. The copolymer of claim 1, in which the proportions of the structural units (A), (B), (C), (D) and (E) add up to 100% by weight.

15. The copolymer of claim 1, which has molecular weights between 50 000 and $2 \cdot 10^7$ g/mol.

16. A composition comprising a copolymer of claim 1 and a crosslinker which comprises a compound of a polyvalent metal ion.

17. The composition as claimed in claim 16, wherein the polyvalent metal ion is an ion selected from the group consisting of zirconium, chromium, titanium, aluminum, and mixtures thereof.

18. A process for extracting mineral oil or natural gas from an underground formation having a borehole, said formation comprising the mineral oil or natural gas and water or saline water and mixtures thereof by altering the permeability of the underground formation for water or saline water, said process comprising:

introducing simultaneously a crosslinker selected from the group consisting of at least one polyvalent alkaline earth metal, a transition metal compound, and mixtures thereof, and an aqueous solution of the copolymer of claim 1 into the formation at a temperature above 200° C., and subsequently extracting from the borehole mineral oil or natural gas, or mixtures thereof.

19. A method for altering the permeability of an underground formation for water or saline water, said method comprising:

introducing into the formation at a temperature above 200° C.—a fluid comprising a crosslinker selected from the group consisting of at least one polyvalent alkaline earth metal, a transition metal compound, and mixtures thereof, and the polymer of claim 1.

* * * * *